(12) United States Patent
Kotecha et al.

(10) Patent No.: US 11,290,915 B2
(45) Date of Patent: Mar. 29, 2022

(54) SYSTEMS AND METHODS FOR GRANULAR BEAMFORMING ACROSS MULTIPLE PORTIONS OF A RADIO ACCESS NETWORK BASED ON USER EQUIPMENT INFORMATION

(71) Applicant: Verizon Patent and Licensing Inc., Basking Ridge, NJ (US)

(72) Inventors: Lalit R. Kotecha, San Ramon, CA (US); Vishwanath Ramamurthi, San Ramon, CA (US); Sudhakar Reddy Patil, Westlake, TX (US); Violeta Cakulev, Milburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 6 days.

(21) Appl. No.: 16/879,390

(22) Filed: May 20, 2020

(65) Prior Publication Data

US 2021/0368393 A1    Nov. 25, 2021

(51) Int. Cl.
| | | |
|---|---|---|
| *H04W 72/04* | (2009.01) | |
| *H04W 28/08* | (2009.01) | |
| *H04B 17/391* | (2015.01) | |
| *H04W 28/02* | (2009.01) | |
| *H04B 7/06* | (2006.01) | |
| *H04W 16/28* | (2009.01) | |

(52) U.S. Cl.
CPC ...... *H04W 28/0942* (2020.05); *H04B 7/0617* (2013.01); *H04B 17/3913* (2015.01); *H04W 16/28* (2013.01); *H04W 28/0268* (2013.01); *H04W 72/046* (2013.01)

(58) Field of Classification Search
CPC .................. H04W 28/09; H04W 28/0942
See application file for complete search history.

(56) References Cited

U.S. PATENT DOCUMENTS

| | | | | |
|---|---|---|---|---|
| 2019/0159102 A1* | 5/2019 | Ryu | ................ | H04W 74/0833 |
| 2020/0267567 A1* | 8/2020 | Chang | ................ | H04W 16/18 |

\* cited by examiner

*Primary Examiner* — Sulaiman Nooristany

(57) ABSTRACT

A system described herein may provide a technique for adaptive and dynamic beamforming in a radio access network ("RAN") of a wireless network, based on information received from User Equipment ("UEs") connected to the RAN, and/or information that can be attributed to UEs and/or users associated with UEs connected to the RAN. For example, a Beam Load Balancing System ("BLBS") of some embodiments may use such information to identify beams, of one or more base stations, for which a configuration should be modified in order to provide RF connectivity to one or more UEs in a manner that optimizes Quality of Service ("QoS") provided to the UEs and/or efficiently utilizes network resources.

20 Claims, 11 Drawing Sheets

SYSTEMS AND METHODS FOR GRANULAR BEAMFORMING ACROSS MULTIPLE PORTIONS OF A RADIO ACCESS NETWORK BASED ON USER EQUIPMENT INFORMATION

BACKGROUND

Wireless network providers may provide radio frequency ("RF") connectivity via multiple beams at a particular base station of a radio access network ("RAN"). The beams may be spatially separated (e.g., pointed in different directions), which may allow portions of RF spectrum to be reused across multiple beams implemented by the same base station.

DETAILED DESCRIPTION OF THE PREFERRED EMBODIMENTS

The following detailed description refers to the accompanying drawings. The same reference numbers in different drawings may identify the same or similar elements.

Embodiments described herein provide for adaptive and dynamic beamforming in a RAN of a wireless network, based on information received from UEs connected to the RAN, and/or information that can be attributed to UEs and/or users associated with UEs connected to the RAN. For example, a Beam Load Balancing System ("BLBS") of some embodiments may use such information to identify beams, of one or more base stations, for which a configuration should be modified in order to provide RF connectivity to one or more UEs in a manner that optimizes Quality of Service ("QoS") provided to the UEs and/or efficiently utilizes network resources.

Figure 1:
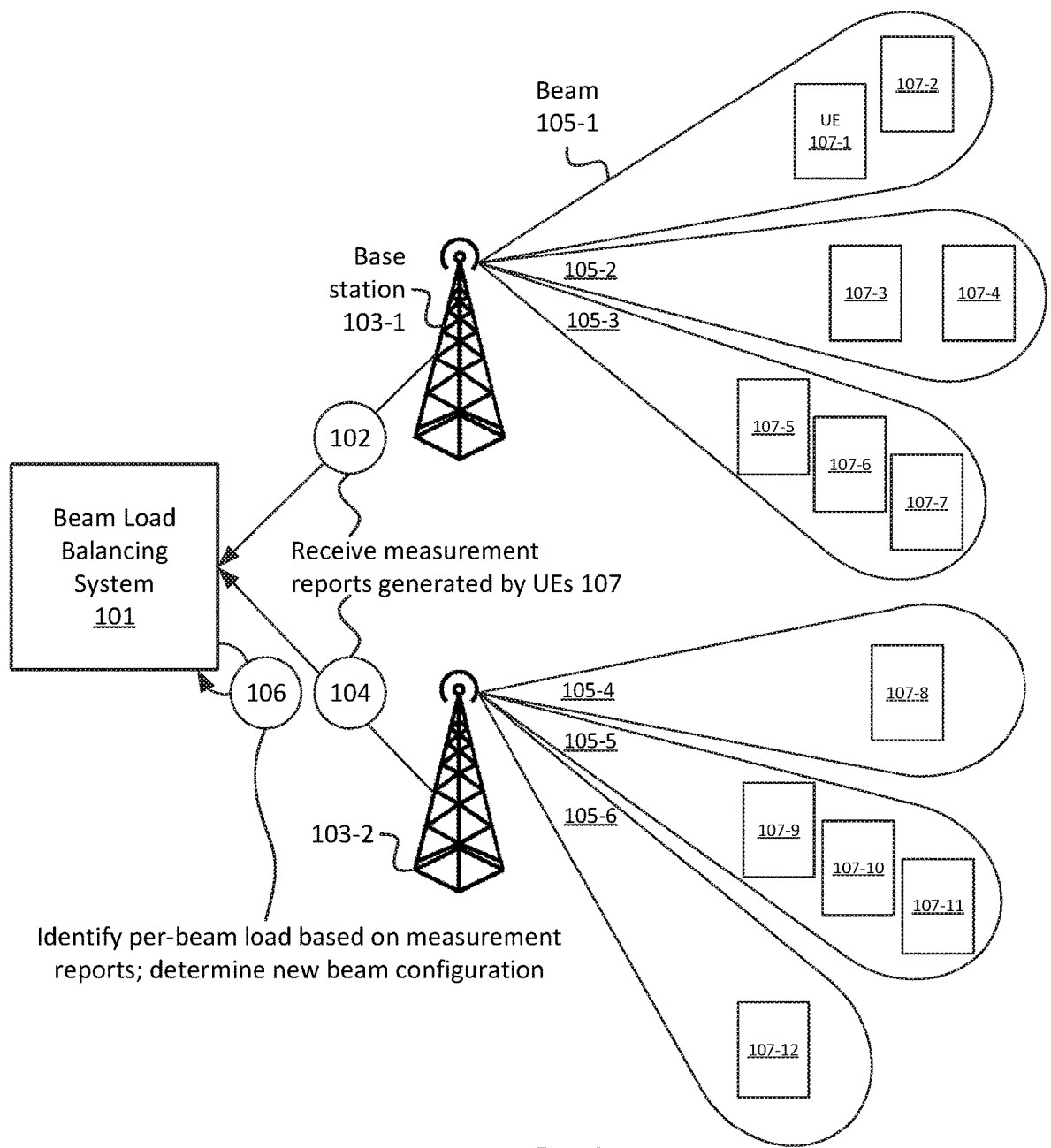
FIGS. 1 and 2 illustrate an example overview of one or more embodiments described herein, in which beam configurations of one or more base stations of a RAN may be modified based on User Equipment ("UE") information received from one or more UEs.

For example, as shown in FIG. 1, two base stations 103-1 and 103-2 of a RAN of a wireless network, which may be referred to individually as "base station 103" or collectively as "base stations 103", may provide RF connectivity via a set of beams 105. For example, base station 103-1 may provide RF connectivity via a first set of beams 105-1, 105-2, and 105-3, while base station 103-2 may provide RF connectivity via a second set of beams 105-4, 105-5, and 105-6. Each beam 105 associated with a particular base station 103 may implement a particular portion of the RF spectrum (e.g., which may be referred to as a set of carriers, and/or which may be represented as Physical Resource Blocks ("PRBs") in the frequency domain).

In this manner, two different beams 105 (e.g., two beams of the same base station 103, and/or two beams of different base stations 103) may implement the same portion of the RF spectrum (e.g., one or more of the same PRBs). Due to spatial separation of the coverage areas of the two different beams 105, interference, conflicts, and/or other potential issues that would otherwise arise from colliding coverage areas of beams may not arise. By way of the different beams implementing the same portion (or portions) of the RF spectrum, capacity of a particular base station 103, with which beams 105 are associated, may be increased. As described herein, configurations of beams 105 (e.g., multiple beams 105 associated with the same base station 103 and/or a different base station 103) may be modified in order to provide enhanced capacity to one or more UEs 107, load balance between beams 105 and/or base stations 103, and/or otherwise cause network resources to be utilized in an efficient manner.

As further shown in FIG. 1, UEs 107 may be connected to a respective base station 103 via a particular beam 105. In an example, UEs 107-1 and 107-2 are connected to base station 103-1 via beam 105-1, UEs 107-3 and 107-4 are connected to base station 103-1 via beam 105-2, and so on. UEs 107 may periodically or intermittently determine signal quality, signal strength, and/or other metrics relating to wireless service provided via beams 105 of base stations 103. For example, UEs 107 may generate measurement reports, which may include Received Signal Strength Indicator ("RSSI") values, Signal-to-Interference-and-Noise-Ratio ("SINR") values, Reference Signal Receive Power ("RSRP") values, Channel Quality Indicator ("CQI") values, and/or other suitable indicators of RF signal quality, strength, etc. The measurement reports may be on a per-beam and/or a per-base station basis. For example, UE 107-9, which is connected to base station 103-2 via beam 105-5 in the example of FIG. 1, may generate a measurement report indicating a signal quality or strength of beams 105-3, 105-4, 105-5, and 105-6, in situations where UE 107-9 is in communications range of these beams.

In some embodiments, UEs 107 may provide the measurement reports to base stations 103, which may provide (at 102 and 104) one or more of the measurement reports to BLBS 101. That is, in some embodiments, BLBS 101 may receive measurement reports, on a per-beam basis, from multiple base stations 103. BLBS 101 may identify (at 106) a measured of load, capacity, congestion, or other suitable metric associated with each beam 105 based on the received measurement reports. For example, BLBS 101 may identify, based on the measurement reports, that a quantity of UEs 107, connected to a particular base station 103 via a particular beam 105, exceeds a threshold quantity of UEs.

Additionally, or alternatively, BLBS 101 may identify, based on the measurement reports, that mismatched or imbalanced quantities of UEs 107 are connected to certain beams 105 as compared to other beams 105. In some embodiments, and as discussed below, BLBS 101 may receive information from base stations 103, indicating RF resource capacity and/or utilization associated with each beam 105 associated with respective base stations 103. For example, BLBS 101 may receive information indicating a quantity of PRBs, associated with a particular beam 105, that are used and/or unused over a particular period of time. In some embodiments, BLBS 101 may also receive (at 102 and 104) location information, indicating geographic locations at which UEs 107 are located.

In some embodiments, BLBS 101 may also receive information indicting a current beam configuration of beams 105. The beam configuration may indicate, for example, a direction (e.g., azimuth angle), width, power, and/or other beam parameters of each beam 105. The beam configuration may also indicate a set of possible parameters that can be applied to each beam, such as a minimum or maximum azimuth angle, a maximum power, etc.

Based on this information (received at 102 and 104, and/or based on other information, such as RF resource capacity and/or utilization, UE location information, or other information), BLBS 101 may determine a per-beam load and/or capacity, and may also determine UEs 107 that are eligible to be served by different beams 105 than are currently serving such UEs 107. For example, BLBS 101 may identify UEs 107 that have provided measurement reports indicating that such UEs 107 are in range of multiple beams 105, may identify that certain UEs 107 would be in range of certain beams 105 if beam parameters were changed. For example, BLBS 101 may use machine learning and/or other suitable techniques to determine that if a direction, width, and/or power of a particular beam 105 were modified, a particular UE 107, which is not currently in range of the particular beam 105, would become in range of the particular beam 105 after such parameters are modified.

In accordance with some embodiments, BLBS 101 may determine (at 106) a new beam configuration for one or more beams 105 of base stations 103. In the example provided with respect to FIGS. 1 and 2, the new beam configuration is determined based on balancing the quantity of UEs 107 connected to particular beams 105. However, as discussed below, other factors may be used in determining a new beam configuration. In some embodiments, the new beam configuration may improve load balancing of UEs 107 among beams 105, on a UE basis (e.g., based on quantity of UEs 107 connected via particular beams 105), on a traffic or load basis (e.g., based on an amount of data consumed by UEs 107 connected via particular beams 105), or on some other suitable basis.

Figure 2:
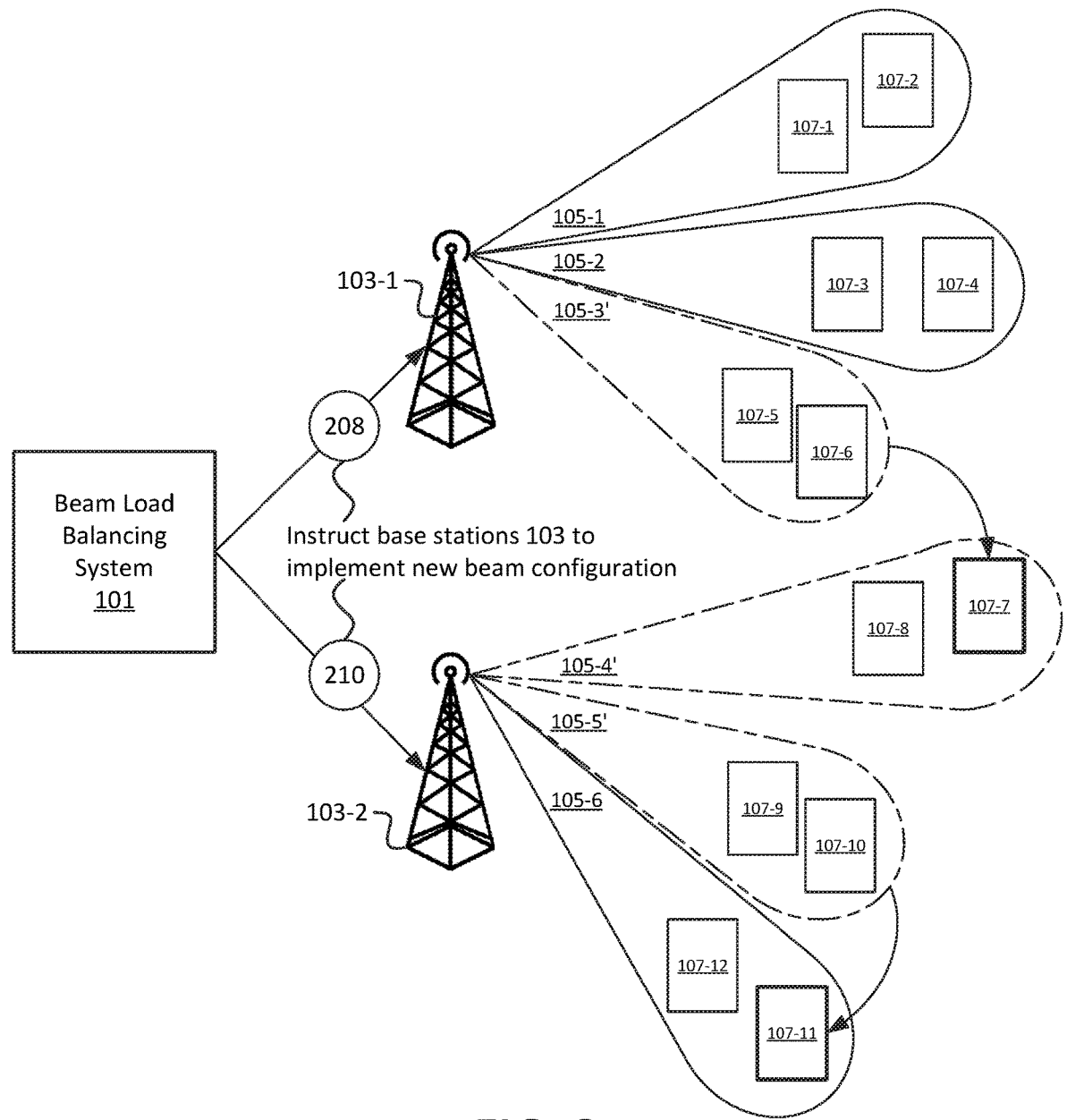

As shown in FIG. 2, BLBS 101 may instruct (at 208 and 210) base stations 103-1 and 103-2 to implement the new beam configuration (determined at 106). In this example, beams 105-3, 105-4, and 105-5 have been modified, yielding modified beams 105-3', 105-4', and 105-5' (denoted in the figure by dashed lines, where beams 105-1, 105-2, and 105-6 are unmodified as compared to FIG. 1). For example, modified beams 105-3', 105-4', and 105-5' may have different directionality, power, width, and/or other parameters as compared to beams 105-3, 105-4, and 105-5, respectively, in FIG. 1. When modifying beams 105, base stations 103-1 and 103-2 may generate or output modified timing signals, pilot signals, reference signals, etc. to notify UEs 107 of the modified beams. For example, base stations 103-1 and 103-2 may modify a set of Synchronization Signal Blocks ("SSBs") to reflect the modified beam configuration, and may broadcast the modified SSBs in lieu of broadcasting a previous version of the SSBs that are based on the previous beam configuration.

As a result of the modifications to beams 105-3, 105-4, and 105-5, one or more UEs 107 may connect via different beams 105 in the example of FIG. 2 than in the example of FIG. 1. For example, as shown in FIG. 2, UE 107-7 may connect to base station 103-2 via modified beam 105-4'. This connection may reflect a change from the connection shown in FIG. 1, in which UE 107-7 is connected to base station 103-1 via beam 105-3. The change in connection may be due to the modification of beam 105-3 and/or the modification of beam 105-4. For example, the coverage area of modified beam 105-3' may be reduced as compared to beam 105-3, which may be based on a smaller width and/or reduced power. Additionally, or alternatively, the directionality of modified beam 105-3' may be different from beam 105-3. Further, the coverage area of modified beam 105-4' may be increased as compared to beam 105'4, which may be based on a larger width and/or increased power. Additionally, or alternatively, the directionality of modified beam 105-4' may be different from beam 105-4.

Based on these changes to beams 105-3 and/or 105-4, signal strength or quality between UE 107-7 and modified beam 105-4' may be higher than between UE 107-7 and modified beam 105-3'. This may be in contrast to the example shown in FIG. 1, in which signal strength or quality between UE 107-7 and beam 105-3 may be higher than signal strength or quality between UE 107-7 and 105-4. As a result of the changed signal strength or quality, UE 107-7 may connect to base station 103-2, via modified beam 105-4'. That is, UE 107-7 may disconnect from base station 103-1 via beam 105-3, based on determining that signal strength or quality metrics associated with modified beam 105-4' are greater than signal strength or quality metrics associated with beam 105-3 (and/or with modified beam 105-3'). For example, UE 107-7 may perform a cell reselection procedure to connect to base station 103-2 via modified beam 105-4'.

As similarly shown in FIG. 2, UE 107-11 may connect to base station 103-2 via a different beam 105-6, than beam 105-5, via which UE 107-11 was previously connected in FIG. 1. For example, based on the new beam configuration (provided at 210), base station 103-2 may modify the coverage area of beam 105-5, to which UE 107-11 was previously connected, such that signal strength or quality metrics between UE 107-11 and beam 105-6 are higher than signal strength or quality metrics between UE 107-11 and modified beam 105-5'. For example, base station 103-2 may reduce a power or width associated with beam 105-5, and/or may alter a directionality of beam 105-5 to face a different direction than UE 107-11. As a result of such modification(s) to beam 105-5, UE 107-11 may connect to base station 103-2 via beam 105-6 (e.g., unmodified beam 105-6) instead of via modified beam 105-5'.

The depiction of UEs 107 (e.g., in particular, UEs 107-7 and 107-11) is not necessarily a geographical or spatial representation. For example, in some scenarios, the physical locations of UEs 107 in FIGS. 1 and 2 may be the same. The "movement" of UEs 107-7 and 107-11, denoted by the arrows in FIG. 2, is intended to depict the connections of UEs 107-7 and 107-11 to different beams 105 in FIG. 2 than in FIG. 1. However, as discussed above, this "movement" may be connections to different beams 105 (e.g., as part of a cell selection or handover procedure), rather than physical movement of UEs 107-7 and 107-11.

As shown in FIG. 2, load balancing may be improved, on a per-beam basis, across base stations 103-1 and 103-2. For example, in FIG. 2, the same quantity of UEs 107 (e.g., two, shown for illustrative purposes) may be connected via each beam 105, whereas some beams 105 may be more heavily loaded or congested than others in FIG. 1, prior to modification. In this manner, load balancing may be performed, on a per-beam basis, on an inter-base station basis (e.g., where UE 107-7 connects to base station 103-2 in FIG. 2 after being connected to base station 103-1 in FIG. 1) and/or on an intra-base station basis (e.g., where UE 107-11 connects to different beams 105 of base station 103-2 in FIGS. 1 and 2). Further, while not explicitly shown in FIGS. 1 and 2, modified beam configurations may include reducing power at one or more beams 105, and/or shutting off one or more beams 105, in situations where such beams 105 may be unnecessary (e.g., where UEs 107 may be served by other beams 105, and/or UEs 107 are not present or predicted to be present in a coverage area of such beams 105).

Figure 3:
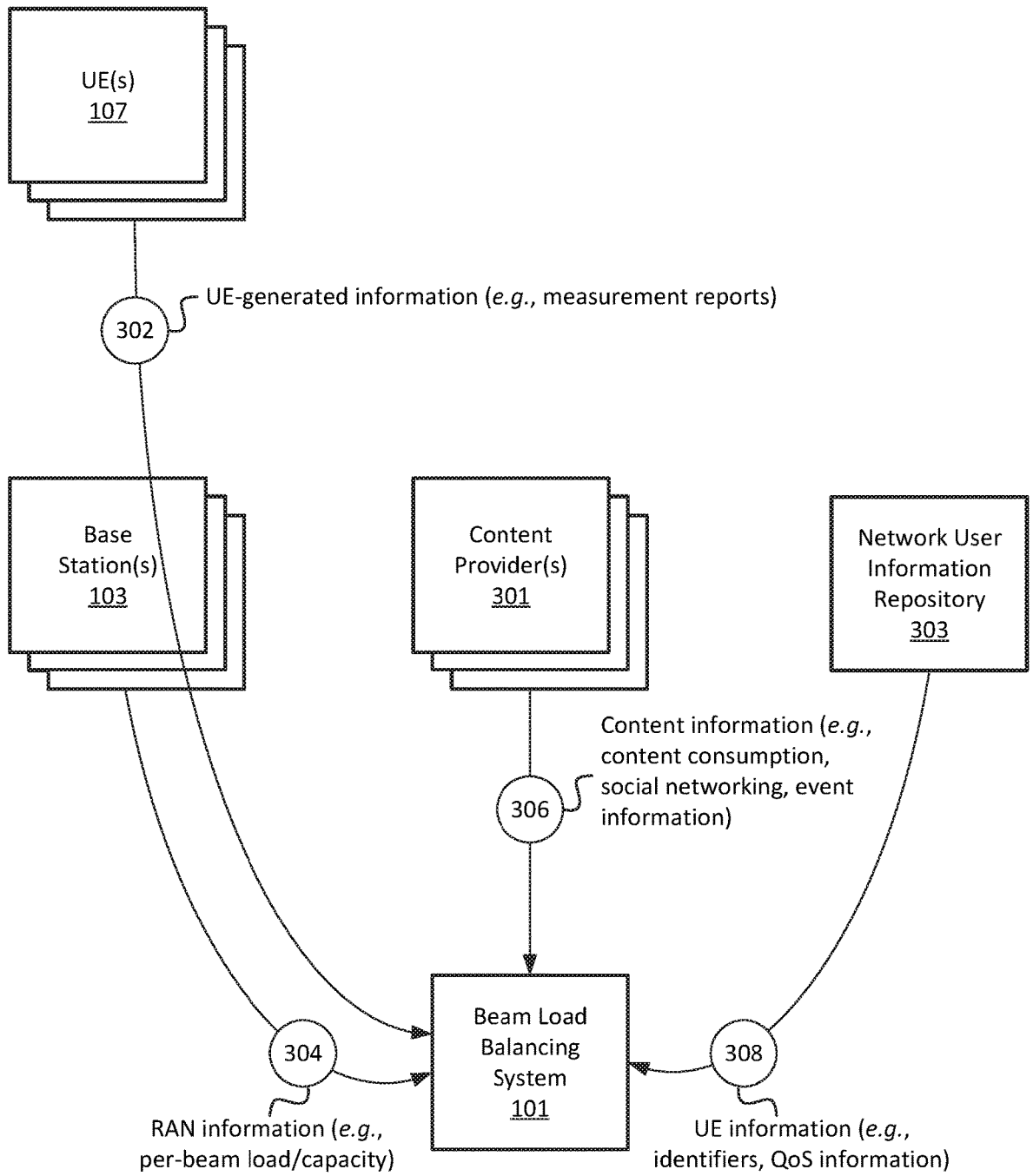
FIG. 3 conceptually illustrates one or more information sources that may be used, in accordance with one or more embodiments, to modify beam configurations of one or more base stations of a RAN.

As mentioned above, BLBS 101 may use other types of information, in addition to or in lieu of, measurement reports from UEs 107 when determining modifications to a beam configuration for one or more base stations 103. For example, as shown in FIG. 3, BLBS 101 may receive information from one or more UEs 107, base stations 103, content providers 301, and/or network user information repository 303.

As shown, for example, BLBS 101 may receive (at 302) UE-generated information, such as measurement reports. In some embodiments, UE-generated information may include other information generated by, and/or otherwise received from, UEs 107. Such information may include, for example, location information (e.g., present or past geographic locations at which UE 107 is/was located), usage information (e.g., amount of traffic sent and/or received from UE 107, uplink buffer status information, or the like), and/or other information. UE-generated information may be received via an application programming interface ("API") and/or other suitable communication interface between BLBS 101, and/or may be "indirectly" received via one or more base stations 103 to which UEs 107 are connected. For example, UE 107 may provide measurement reports to base station 103 (e.g., where UE 107 is not "aware" of BLBS 101), and base station 103 may provide such measurement reports to BLBS 101.

As similarly mentioned above, BLBS 101 may utilize UE-generated information to determine where UEs 107 are located, which may aid in determining which beams 105 are in range of certain UEs 107. For example, as similarly described above, when determining a new beam configuration (e.g., direction, width, power, etc. of one or more beams 105), BLBS 101 may take into account locations of UEs 107, which would be located within a coverage area of beams 105 after modification.

As another example, usage information associated with a particular UE 107 may indicate a volume and/or type (e.g., voice call, video streaming, etc.) of traffic sent and/or received by UE 107. BLBS 101 may, as discussed below, determine usage patterns associated with UE 107 based on the usage information, which may aid in dynamically and/or predictively modifying configurations of one or more beams 105 to which UE 107 is connected and/or is in range of. Generally speaking, for instance, load balancing across beams may be performed in a manner that balances types and/or amounts of traffic sent and/or received by UEs.

As further shown, BLBS 101 may receive (at 304) RAN information from one or more base stations 103. RAN information may indicate, for example, capacity and/or load of base stations 103, on a per-beam basis. The RAN information may include, for example, a quantity of UEs 107 connected to base station 103, a quantity of UEs 107 connected to one or more beams 105 implemented by base station 103, a quantity or proportion of RF resources (e.g., PRBs) on a per-beam basis that are available and/or are utilized over a given time window, scheduling information (e.g., allocations of uplink and/or downlink RF resources on a per-beam basis), and/or other RAN-related metrics. In some embodiments, the RAN information may include usage information regarding UEs 107, such as per-UE uplink and/or downlink usage of RF resources. Such information may be received in addition to or in lieu of usage information from UEs 107.

BLBS 101 may further receive (at 306) content-related information from one or more content providers 301. Content providers 301 may include application servers and/or other network-accessible resources that provide content and/or services, such as video content streaming services, voice and/or video calling services, social networking services, messaging services, and/or other services.

Content providers 301 may maintain, host, and/or otherwise publicly provide information associated with one or more UEs 107. For example, a particular content provider 301 may include a social networking website, whereby a user of UE 107 publicly posts information or other social media activity. Such information may indicate, for example, that the user is interested in a particular event that is scheduled to begin at some time in the future (e.g., a concert, sporting event, or the like). In some embodiments, content providers 301 may provide content information, such as particular content accessed by users associated with UE 107 (e.g., particular movies, songs, or the like). In some embodiments, content providers 301 may provide usage information, such as an amount of data sent to and/or from particular UEs 107. As noted below, such information may be obtained with consent of users associated with UEs 107, and/or may be information publicly provided by such users.

In some embodiments, information received from content providers 301 may include identifiers (e.g., usernames and/or other identifiers) of users that are not necessarily correlated to UEs 107. That is, for example, base station 103 may identify UEs 107 using identifiers such as International Mobile Subscriber Identity ("IMSI") values, Globally Unique Temporary Identifier ("GUTI") values, Subscription Permanent Identifier ("SUPI") values, and/or other identifiers, while content providers 301 may identify UEs 107 and/or associated users with different values. In some embodiments, network user information repository 303 may maintain information mapping usernames or other identifiers, as utilized by content provider 301, with IMSI values, GUTI values, SUPI values, and/or other identifiers utilized by UEs 107 and/or base stations 103. For example, a user of UE 107 may have performed a registration process with a wireless network provider, with which network user information repository 303 is associated, to correlate such identifiers together. In some embodiments, network user information repository 303 may include, and/or may be communicatively coupled with, a Home Subscriber Server ("HSS"), Unified Data Management function ("UDM"), or other device or system of a wireless network that maintains UE and/or subscriber information.

BLBS 101 may receive (at 308) such correlation information from network user information repository 303, in order to correlate information received (at 306) from one or more content providers 301 to one or more respective UEs 107. For example, BLBS 101 and network user information repository 303 may communicate via an API or some other suitable interface.

Examples of information, that may be received and utilized by BLBS 101, are described above. In practice, BLBS 101 may receive other types of information from the same or other sources, in order to determine usage information associated with UEs 107, network resource information associated with base stations 103 (e.g., on a per-beam basis), and/or other suitable information.

Based on some or all of the information discussed above, BLBS 101 may generate one or more models for UEs 107, may classify UEs 107 in one or more classifications or categories, may score UEs 107 according to classifications or categories, and/or may otherwise identify attributes associated with UEs 107.

Figure 4:
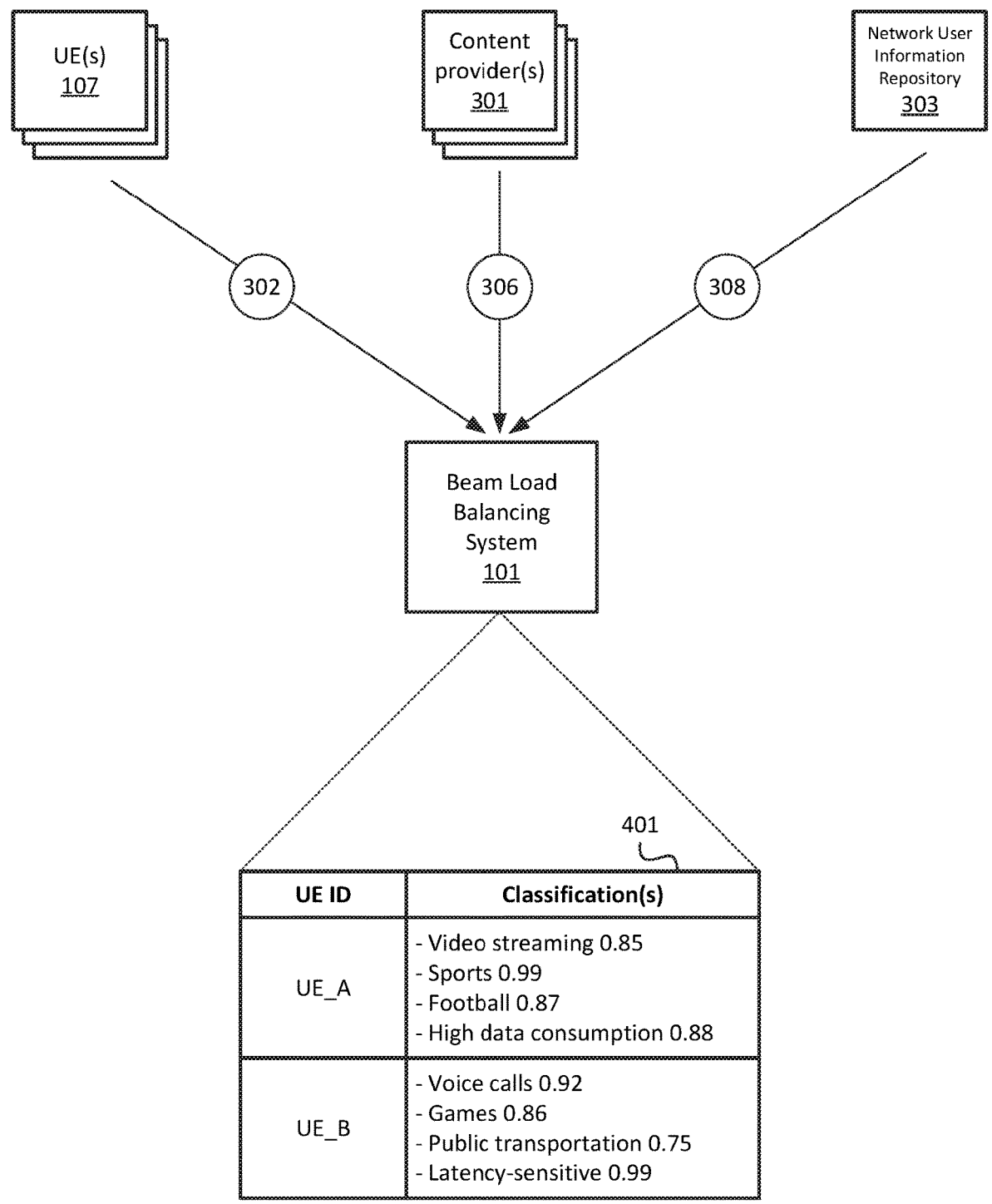
FIG. 4 illustrates example classifications of one or more UEs based on UE-generated information, content provider information, and network information, in accordance with one or more embodiments.

For example, as shown in FIG. 4, BLBS 101 may maintain data structure 401, which may include classifications for two example UEs 107 ("UE_A" and "UE_B"). While the example identifiers shown in FIG. 4 are "UE_A" and "UE_B," in practice, identifiers such as IMSI values, SUPI vales, GUTI values, and/or other suitable identifiers may be used to identify UEs 107.

BLBS 101 may generate data structure 401 based on information received (at 302, 306, and/or 308) from UEs 107 (e.g., via base stations 103), content provider 301, network user information repository 303, and/or one or more other sources. In some embodiments, BLBS 101 may utilize machine learning techniques and/or other suitable techniques to generate and/or modify data structure 401.

In the example shown here, data structure 401 may include classifications for UEs 107 as well as associated scores, which may indicate an affinity, likelihood, etc. of a given UE 107 for a given classification. The classifications may be determined through machine learning techniques, may be manually provided or indicated, and/or may be determined in some other suitable fashion. In this example, UE_A has a score of 0.85 (e.g., on a scale of 0 to 1) for a "Video streaming" classification, a score of 0.99 for a "Sports" classification, a score of 0.87 for a "Football" classification, and a score of 0.88 for a "High data consumption" classification. These classifications may be based on, for example, information from a particular content provider 301 that provides video streaming services, which have been accessed by UE_A. Further, content provider 301 may offer multiple categories of content, including football-related content and/or other sports-related content, which may be relatively heavily accessed by UE_A (or a user account associated with UE_A). Based on such information, BLBS 101 may classify UE_A with relatively high scores for associated classifications. Additionally, or alternatively, content provider 301 may include a social networking website or a blog website, via which UE_A (or a user account of a user associated with UE_A) may make public posts indicating his or her interest in football.

In some embodiments, BLBS 101 may determine the classification "High data consumption" (and/or the associated score of 0.88, in this example) based on usage information received from one or more content providers 301, UE_A, and/or one or more other sources. For example, content provider 301 may indicate an amount of data provided to UE_A, and/or UE_A may indicate (to BLBS 101) an amount of data sent and/or received by UE_A, which may be a factor in determining the "High data consumption" classification (and/or the associated score of 0.88, in this example) for UE_A.

Similar concepts may apply for determining classifications (and/or associated scores) for UE_B and/or other UEs 107. Further, while data structure 401 is described here in the context of classifications and associated scores, in practice, UEs 107 may be classified, categorized, modeled, etc. in other suitable ways.

As noted above, such models, classifications, etc. may be used by one or more base stations 103 of a RAN of a wireless network to modify or implement configurations of different beams via which such base stations 103 provide wireless service to UEs 107. One such example is described below with respect to FIGS. 5 and 6. In these figures, example beam configurations are shown for UEs 107 classified as "High data consumption." Further, in this example, "High data consumption" is discussed in terms of a binary classification, in which UEs 107 are either classified as "High data consumption" or are not classified as "High data consumption." In practice, actual scores, weights, affinities, etc. may be used as a factor in modifying beam configurations, using similar concepts as those described herein.

Figure 5:
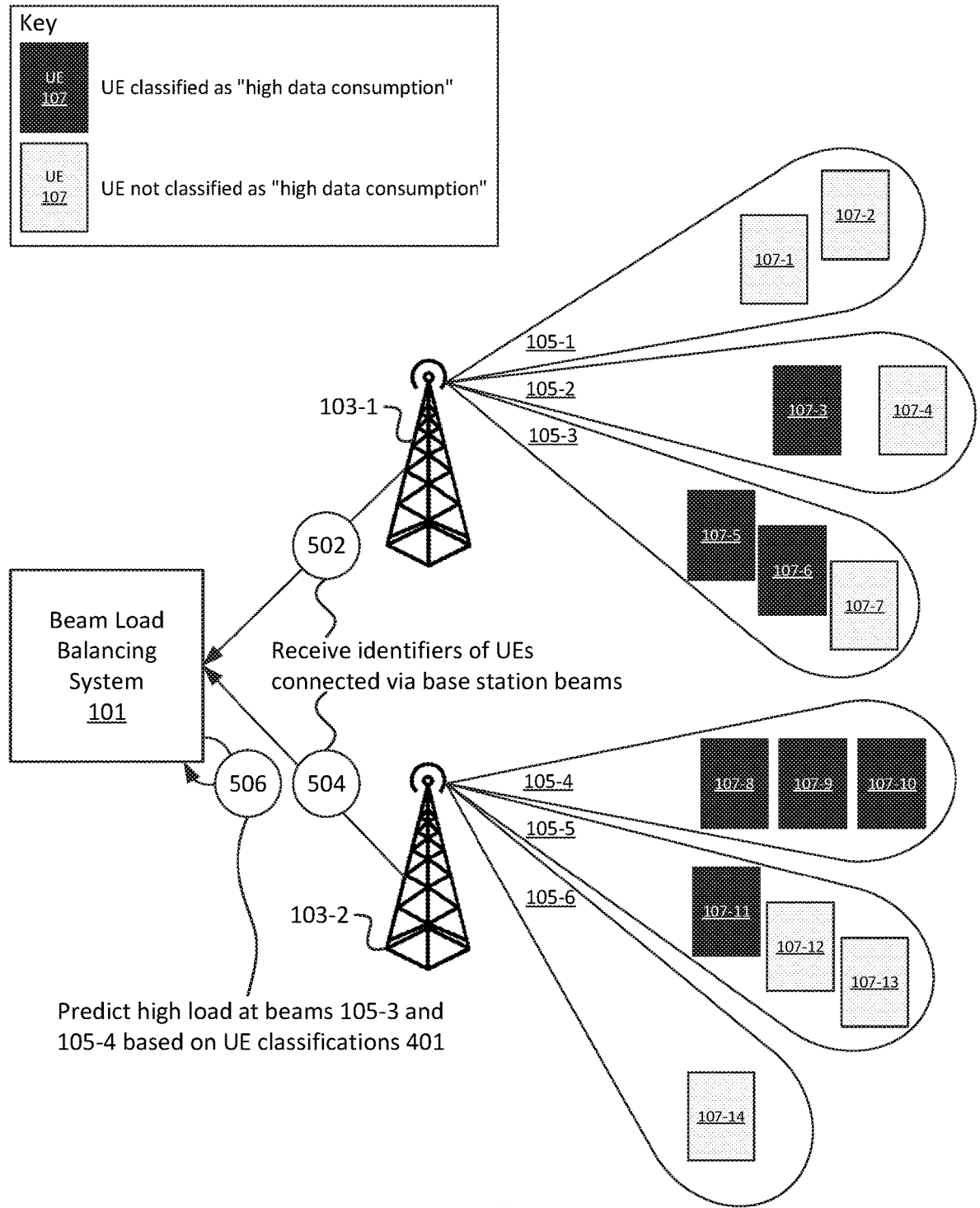
FIGS. 5 and 6 illustrate an example beam configuration modification based on detecting the connection or presence of one or more UEs that have been classified as having one or more particular attributes.

As shown in FIG. 5, for example, BLBS 101 may receive (at 502 and 504) identifiers of UEs 107 that are connected to base stations 103-1 and 103-2. Assume, for this example, that BLBS 101 maintains models, classifications, etc. for these UEs 107 (e.g., as similarly described above with respect to data structure 401) that indicate that UEs 107-3, 107-5, 107-6, 107-8, 107-9, 107-10, and 107-11 are "High data consumption" UEs. Additionally, or alternatively, BLBS 101 may maintain models, classifications, etc. for other UEs 107-1, 107-2, 107-4, 107-7, 107-12, 107-13, and 107-14 indicating that these other UEs are not "High data consumption" UEs.

As shown, for example, a relatively large number of "High data consumption" UEs may be connected to base station 103-1 via beam 105-4 (e.g., three UEs 107). In some embodiments, BLBS 101 may identify, for instance, that a relatively large quantity (e.g., greater than a threshold quantity) and/or that a relatively large proportion (e.g., greater than a threshold proportion) of UEs 107 connected to beam 105-4 are "High data consumption" UEs.

Based on detecting the relatively large number of "High data consumption" UEs at beam 105-4, BLBS 101 may predict (at 506) a relatively high network load at beam 105-4. This prediction may, in some embodiments, be made without, or independent of, actual real-time usage information from base stations 103-1 and/or 103-2. That is, although beam 105-4 may be identified as having potentially high network load, this identification may be made based on identifying the presence of "High data consumption" UEs, and not necessarily based on usage information from base station 103-2. In this manner, the identification of the potential high network load may be considered a "prediction" based on models associated with UEs 107.

Figure 6:
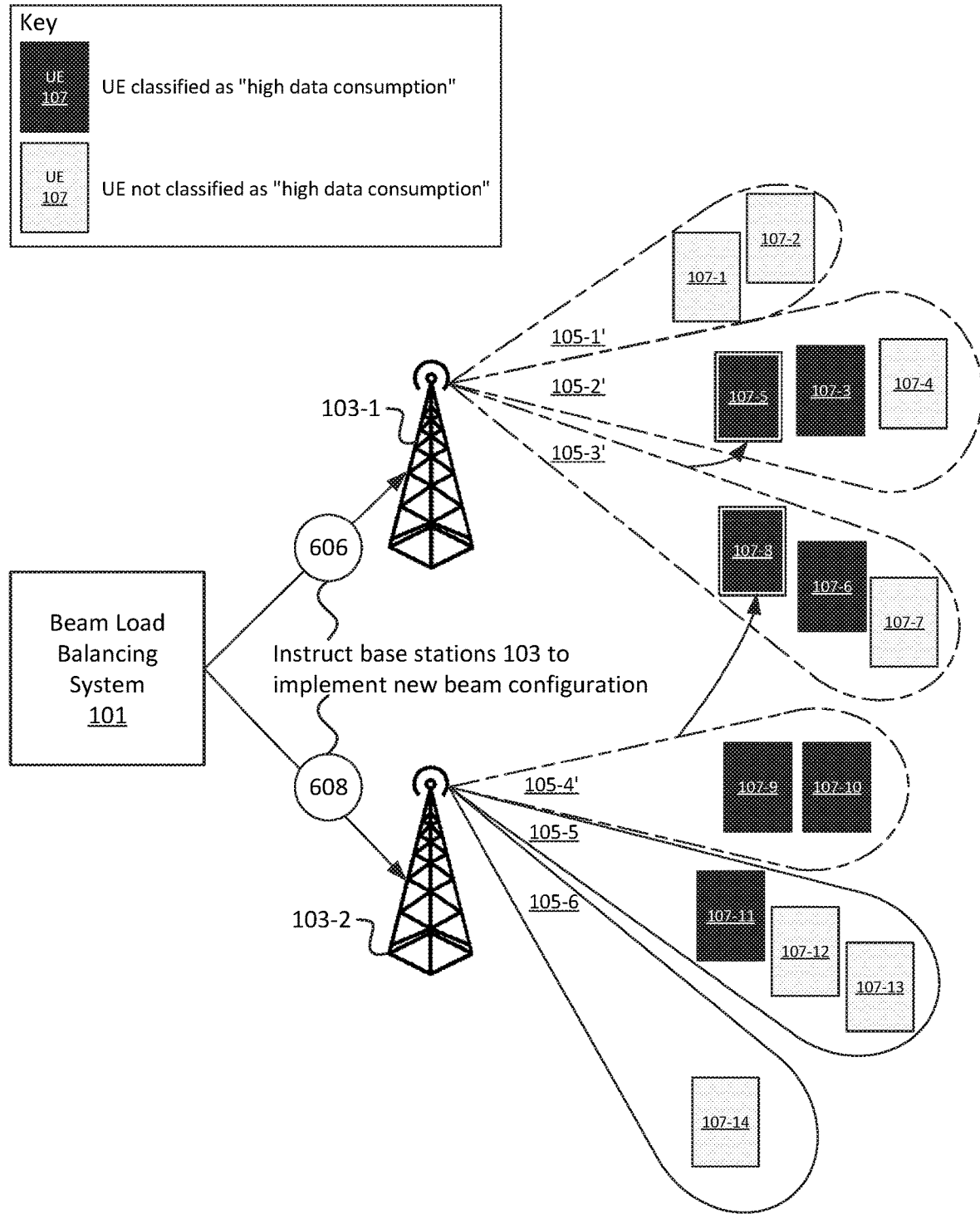

Based on this prediction, as shown in FIG. 6, BLBS 101 may instruct (at 606 and 608) base stations 103-1 and 103-2 to implement a new beam configuration. The new beam configuration may be determined or generated by BLBS 101 based on one or more factors, such as the determination (shown in FIG. 5) of the relatively large number of "High data consumption" UEs at beam 105-4. BLBS 101 may further determine, for example, that other beams, such as beams 105-1, 105-2, 105-3, 105-5, and 105-6 are serving relatively fewer "High data consumption" UEs than beam 105-4. Thus, the new beam configuration may be generated by BLBS 101 in a manner that attempts to load balance the "High data consumption" UEs across additional beams (e.g., in addition to beam 105-4), including causing some of the "High data consumption" UEs to connect via beams that have relatively fewer connected "High data consumption" UEs.

To achieve this, and as further shown in FIG. 6, beams 105-3 and/or 105-4, with the relatively large numbers of connected "High data consumption" UEs, may be modified, resulting in modified beams 105-3' and 105-4'. As discussed above, the modifications may include adjustments to beam width, azimuth angle, antenna power, and/or other suitable parameters. For example, the modifications may be made in a manner that attempts to cause some of the UEs 107, that are connected via beam 105-4, to connect to other beams. Such modifications may include narrowing a width of beam 105-4, lowering antenna power associated with beam 105-4, and/or modifying directionality of beam 105-4 such that fewer UEs 107 are in coverage areas of beam 105-4. Additionally, or alternatively, modifications to beams associated with base stations 103-1 and/or 103-2 may include modifying beams that are connected to relatively fewer, or zero, UEs 107 that have been classified as "High data consumption" UEs. For example, as shown in FIG. 6, beams 105-1, 105-2, and 105-3 may also have be modified, resulting in modified beams 105-1', 105-2', and 105-3'.

As shown, based on the modifications of beams 105-1, 105-2, 105-3, and 105-4, UE 107-5 may disconnect from beam 105-3 and connect via beam 105-2', and UE 107-8 may disconnect from beam 105-4 and may connect via beam 105-3'. As discussed above, these disconnections and connections may, in some embodiments, be performed based on a UE-implemented or -initiated cell reselection procedure. As a result of the connections of these UEs 107 to different beams 105, each of the beams 105 shown in FIG. 6 may be connected to fewer than a threshold quantity of "High data consumption" UEs. That is, the example shown in FIG. 6 depicts zero, one, or two "High data consumption" UEs at each beam 105, which is less than the example threshold of three "High data consumption" UEs.

As noted above, while a binary example of "High data consumption" UEs or UEs not classified as "High data consumption" UEs is described above, similar concepts may apply based on scores or other types of values. For example, continuing with the example "High data consumption" classification, assume that each of the UEs shown in FIGS. 5 and 6 is associated with a "High data consumption" score. When load balancing UEs across beams (e.g., on the basis of "High data consumption" scores), BLBS 101 may attempt to keep an average or median "High data consumption" score, across the beams, as low as possible. As another example, BLBS 101 may attempt to keep a variance or standard deviation of "High data consumption" scores, across the beams, as low as possible. As yet another example, BLBS 101 may attempt to cluster as many "High data consumption" UEs into the same beam or beams as possible. In practice, similar concepts may apply to arrange UEs across beams in any suitable manner, based on some or all of the information sources discussed above, and/or other suitable information sources.

Figure 7:
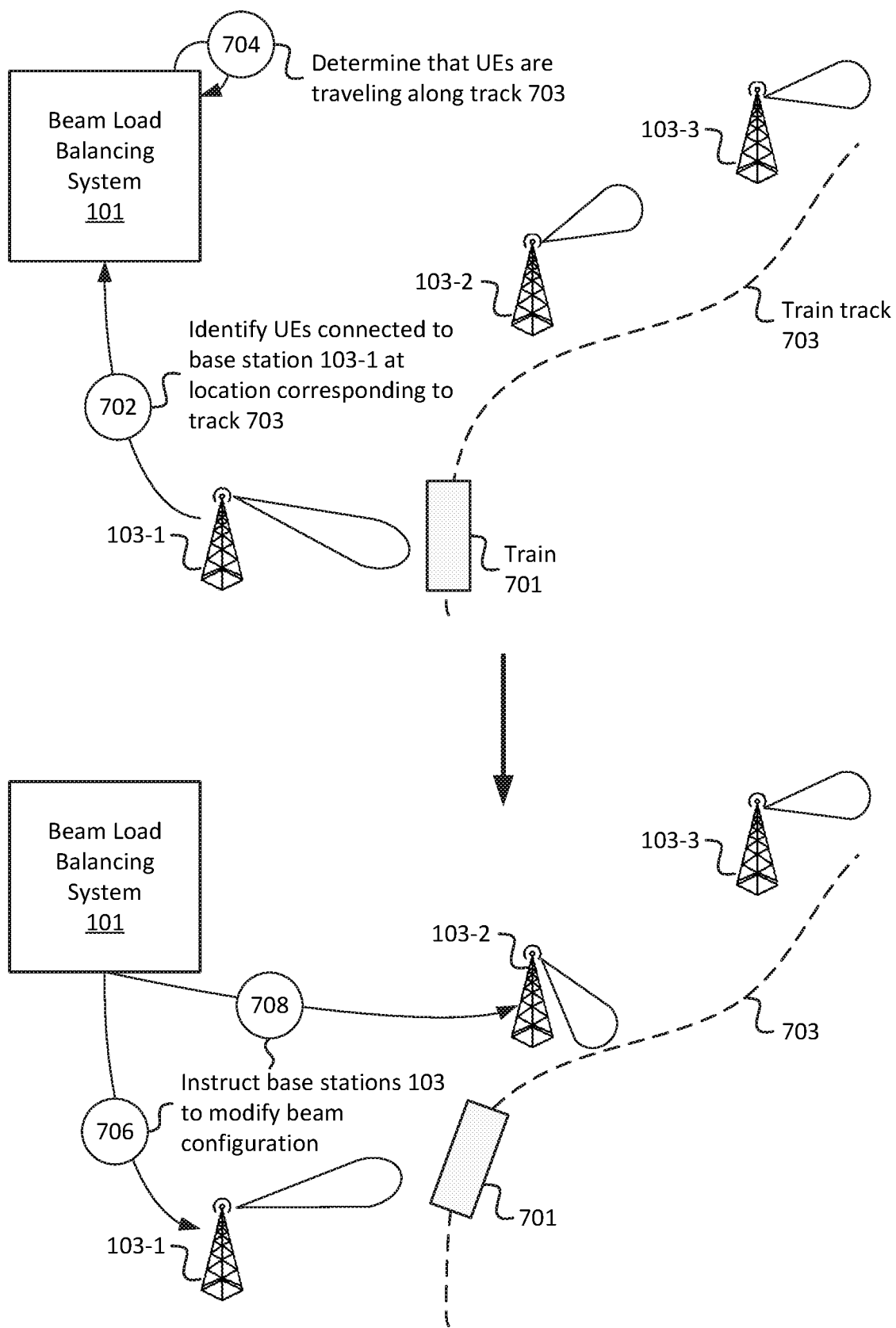
FIG. 7 illustrates an example situation, in accordance with some embodiments, in which a beam configuration may be dynamically and/or predictively modified in real time based on UE-provided information.

FIG. 7 illustrates an example scenario in which base stations 103-1, 103-2, and 103-3 are located relatively close to train track 703, on which train 701 may be traveling at a given time. Further, base stations 103-1, 103-2, and 103-3 may have the capability of providing wireless coverage, via one or more beams, to UEs 107 that are located on train 701. As further shown, base stations 103-1, 103-2, and 103-3 may be communicatively coupled with BLBS 101.

As train 701 traverses track 703 and enters communication range of base station 103-1, base station 103-1 may provide (at 702) information regarding UEs 107 that are connected to base station 103-1 via one or more beams 105 implemented by base station 103-1. Further, although not described at length here in this example, similar techniques as described above may be used by BLBS 101 to predict or otherwise determine the presence of these UEs 107 at a location corresponding to track 703 and at a time corresponding to when train 701 is located at this particular location. For example, BLBS 101 may have analyzed social media postings, train schedules, predictive models associated with these UEs 107, and/or other suitable information to predict the presence of these UEs 107.

Based on the above information (e.g., based on information received from base station 103-1 and/or based on predicting the presence of UEs 107 on train 701 at a given time), BLBS 101 may determine (at 704) that these UEs 107 are present on train 701. BLBS 101 may also monitor geographic location information, measurement reports, train system map information, train schedules, and/or other suitable information provided by base station 103-1, base station 103-2, and/or one or more of the UEs 107, in order to determine a speed, heading, etc. associated with UEs 107 and/or train 701. For example, BLBS 101 may determine, based on location information of UEs 107 received over time, that UEs 107 are moving relatively quickly (e.g., a speed that generally corresponds to a train or some other moving vehicle), that UEs 107 are located proximate to a known track 703, that a time at which UEs 107 were detected or predicted corresponds to a time indicated in a train schedule, and/or that one or more UEs 107 are associated with public content (e.g., a social media post) indicating that UE 107 will be present on train 701.

Based on detecting the presence of UEs 107 on train 701, BLBS 101 may instruct (at 706 and 708) base stations 103-1 and 103-2 to modify their beam configurations. For example, BLBS 101 may instruct base stations 103-1 and 103-2 multiple times during a time period in which train 701 is in communication range of base stations 103-1 and/or 103-2, such that one or more beams 105 implemented by base stations 103-1 and/or 103-2 may "follow" or "track" train 701, in order to provide optimal coverage to UEs 107 located on train 701. After train 701 exits the coverage area associated with base stations 103-1 and 103-2, BLBS 101 may instruct base stations 103-1 and 103-2 to revert to a prior beam configuration and/or may otherwise indicate that the modified beam configuration (instructed at 706 and 708) is no longer needed.

Figure 8:
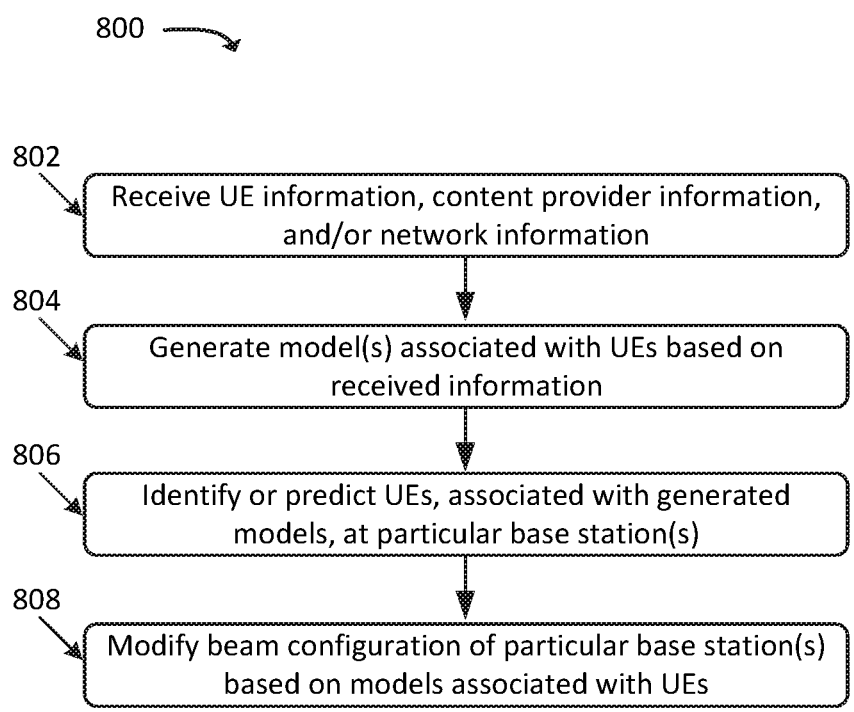
FIG. 8 illustrates an example process for modifying a beam configuration of one or more base stations based on predictive models associated with one or more connected UEs.

FIG. 8 illustrates an example process 800 for modifying a beam configuration of one or more base stations 103 based on predictive models associated with one or more connected UEs 107. In some embodiments, some or all of process 800 may be performed by BLBS 101. In some embodiments, one or more other devices may perform some or all of process 800 in concert with, and/or in lieu of, BLBS 101.

As shown, process 800 may include receiving (at 802) UE information, content provider, network information, and/or other information regarding one or more UEs 107 or users associated with such UEs 107. For example, as discussed above, BLBS 101 may receive UE-generated information from one or more UEs 107 via an API or some other suitable communication interface. The UE-generated information for a particular UE 107 may include, for example, usage information, measurement reports, and/or other information regarding activity associated with the particular UE 107. Further, as discussed above, BLBS 101 may receive content information, such as types or amounts of traffic sent and/or received by one or more UEs 107, public information posted by one or more UEs 107 or associated users, or other suitable information, from one or more content providers 301. Additionally, or alternatively, BLBS 101 may receive information from network user information repository 303, which may include correlation information that may be used to identify particular UEs 107 with which information, received from content providers 301, is associated. In some embodiments, network user information repository 303 may provide information, such as subscription information, Quality of Service ("QoS") information, Service Level Agreement ("SLA") information, or the like, based on which BLBS 101 may determine minimum threshold performance metrics (e.g., minimum latency, maximum throughput, etc.) associated with particular UEs 107, which may be used as a factor in determining modified beam configurations.

Process 800 may further include generating (at 804) one or more models associated with UEs 107 based on the received information. For example, as discussed above, BLBS 101 may use machine learning or some other suitable technique in order to generate one or more models associated with UEs 107. In the example described above with respect to FIG. 4, the model for a given UE 107 may include classifications and scores or weights for the classifications for the given UE 107. In practice, other suitable formats or types of models may be used.

Process 800 may additionally include identifying or predicting (at 806) the presence of one or more UEs 107, associated with the generated models, at one or more base stations 103. For example, as discussed above, BLBS 101 may receive information (e.g., from UEs 107, base stations 103, and/or some other source) indicating that particular UEs 107 are connected to base stations 103, and/or to particular beams 105 of base stations 103. As discussed above, BLBS 101 may determine, based on the generated models, predicted behavior or usage associated with such UEs 107, including whether UEs 107 are likely to consume relatively large amounts of data, require low-latency communications, move from one location to another, and/or other parameters associated with UEs 107. In some embodiments, as also discussed above, BLBS 101 may receive network-related information from base stations 103, which may include load and/or capacity information associated with one or more beams 105 of base stations 103.

Process 800 may also include modifying (at 808) a beam configuration of base stations 103, based on the models associated with UEs 107 and/or the received network-related information. For example, BLBS 101 may modify the azimuth angle, antenna power, beam width, and/or other parameters based on the predicted and/or monitored usage associated with UEs 107. For example, as discussed above, beams may be modified in order to load balance network resources, improve capacity in situations where additional capacity may be needed (e.g., when a relatively large quantity of UEs 107, that are associated with high data usage, are connected via a particular beam 105), and/or provide other benefits as outlined above. As noted above, the modifications may be performed across base stations 103, such that beams 105 of one base station 103 may be modified based on information associated with one or more UEs 107 connected to a different base station 103.

Figure 9:
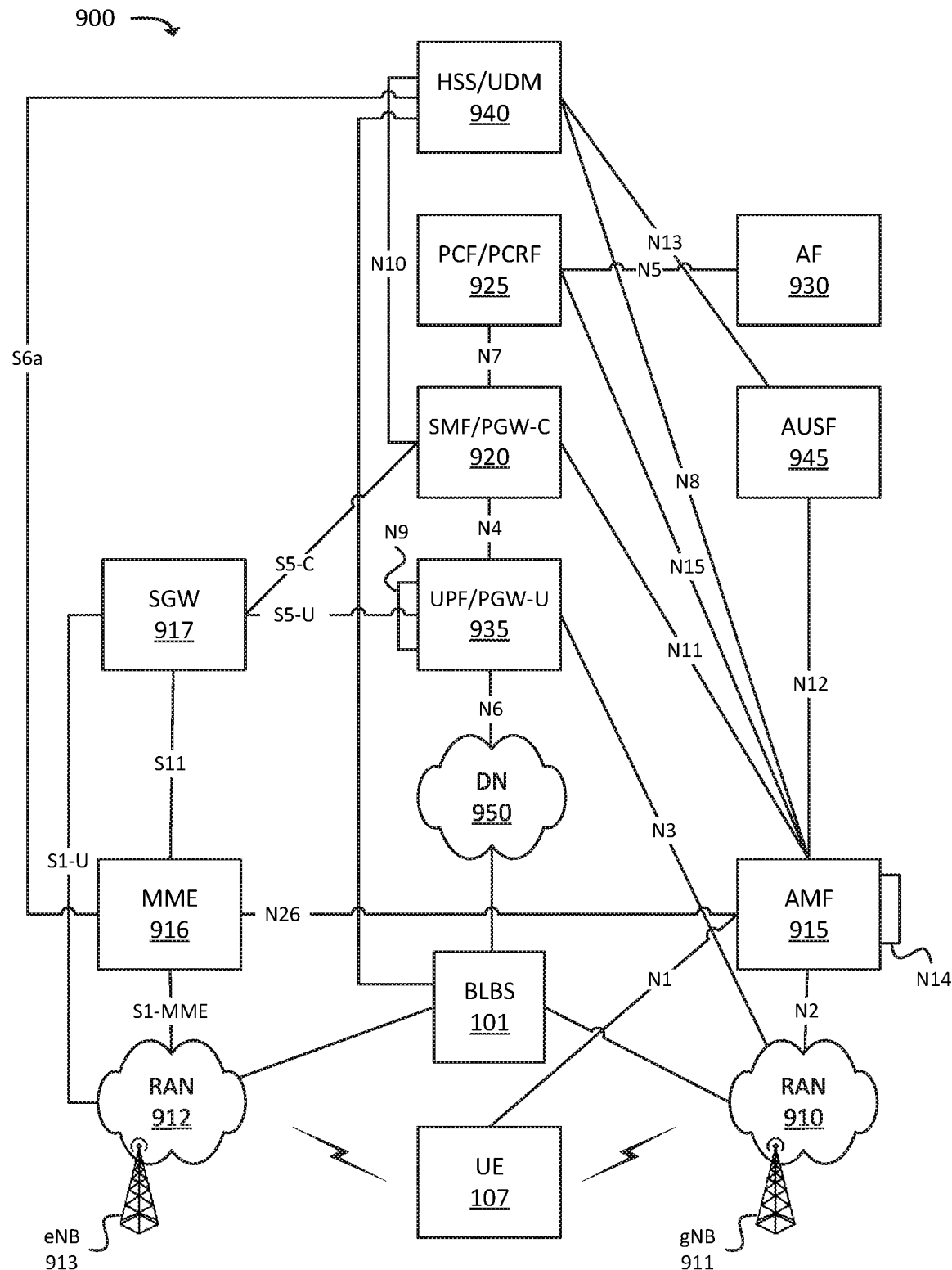
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 900 may include UE 901, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, Authentication Server Function ("AUSF") 945, and BLBS 101. Environment 900 may also include one or more networks, such as Data Network ("DN") 950.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 901 may include a computation and communication device, such as a wireless mobile communication device that is capable of communicating with RAN 910 and/or DN 950. UE 901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, a Mobile-to-Mobile ("M2M") device, or another type of mobile computation and communication device. UE 901 may send traffic to and/or receive traffic (e.g., user plane traffic) from DN 950 via RAN 910 and UPF/PGW-U 935.

RAN 910 may be, or may include, a 5G RAN that includes one or more base stations (e.g., one or more gNBs 911), via which UE 901 may communicate with one or more other elements of environment 900. UE 901 may communicate with RAN 910 via an air interface (e.g., as provided by gNB 911). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, AMF 915, and/or one or more other devices or networks) and may communicate the traffic to UE 901 via the air interface. In some embodiments, base station 103 may be, may include, and/or may be implemented by gNB 911.

RAN 912 may be, or may include, an LTE RAN that includes one or more base stations (e.g., one or more eNBs 913), via which UE 901 may communicate with one or more other elements of environment 900. UE 901 may communicate with RAN 912 via an air interface (e.g., as provided by eNB 913). For instance, RAN 910 may receive traffic (e.g., voice call traffic, data traffic, messaging traffic, signaling traffic, etc.) from UE 901 via the air interface, and may communicate the traffic to UPF/PGW-U 935, and/or one or more other devices or networks. Similarly, RAN 910 may receive traffic intended for UE 901 (e.g., from UPF/PGW-U 935, SGW 917, and/or one or more other devices or networks) and may communicate the traffic to UE 901 via the air interface. In some embodiments, base station 103 may be, may include, and/or may be implemented by eNB 913.

AMF 915 may include one or more devices, systems, Virtualized Network Functions ("VNFs"), etc., that perform operations to register UE 901 with the 5G network, to establish bearer channels associated with a session with UE 901, to hand off UE 901 from the 5G network to another network, to hand off UE 901 from the other network to the 5G network, manage mobility of UE 901 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 901 with the EPC, to establish bearer channels associated with a session with UE 901, to hand off UE 901 from the EPC to another network, to hand off UE 901 from another network to the EPC, manage mobility of UE 901 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 901. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 901, from DN 950, and may forward the user plane data toward ULE 901 (e.g., via RAN 910, SMF/PGW-C 920, and/or one or more other devices). In some embodiments, multiple UPFs 935 may be deployed (e.g., in different geographical locations), and the delivery of content to UE 901 may be coordinated via the N9 interface (e.g., as denoted in FIG. 9 by the line marked "N9" originating and terminating at UPF/PGW-U 935). Similarly, UPF/PGW-U 935 may receive traffic from UE 901 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 901.

BLBS 101 may include one or more devices, systems, VNFs, etc. that perform one or more operations here. For example, as discussed above, BLBS 101 may utilize machine learning or other suitable techniques to generate one or more models associated with UEs 107, and to modify beam configurations of base stations 103 (e.g., one or more gNBs 911 and/or eNBs 913) based on the models, network information received from base stations 103, and/or other suitable information.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 901 may communicate, through DN 950, with data servers, other UEs 901, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 901 may communicate.

Figure 10:
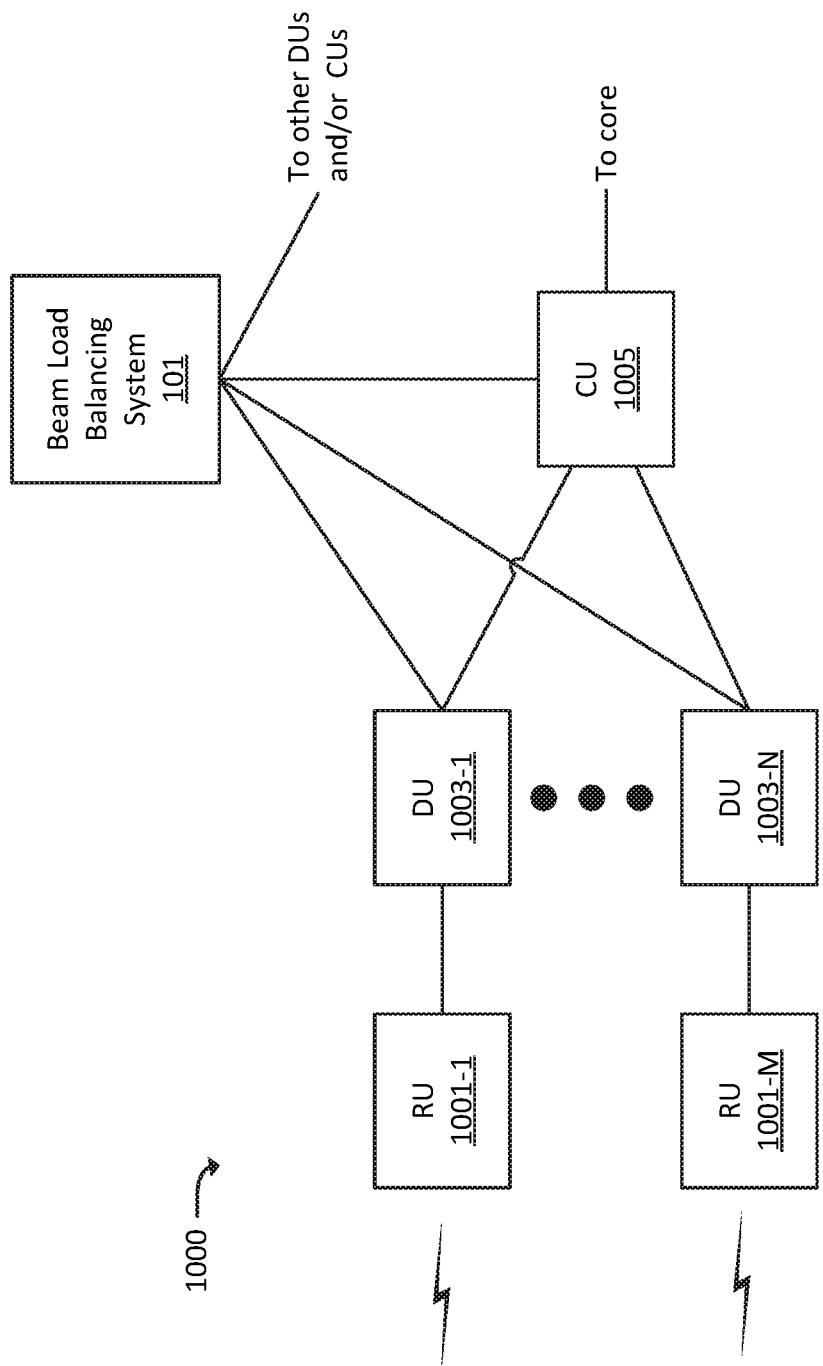
FIG. 10 illustrates an example arrangement of a RAN, in accordance with some embodiments.

FIG. 10 illustrates an example Distributed Unit ("DU") network 1000, which may be included in and/or implemented by one or more RANs (e.g., RAN 910). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Control Unit ("CU") 1005, one or more Distributed Units ("DUs") 1003-1 through 1003-N (referred to individually as "DU 1003," or collectively as "DUs 1003"), and one or more Remote Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 901 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 901, and may determine which DU(s) 1003 should receive the downlink traffic. DU 1003 may include one or more devices that transmit traffic between a core network (e.g., via CU 1005) and UE 901 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 901.

RU 1001 may include hardware circuitry (e.g., one or more RF transceivers, antennas, radios, and/or other suitable hardware) to communicate wirelessly (e.g., via an RF interface) with one or more UEs 901, one or more other DUs 1003 (e.g., via RUs 1001 associated with DUs 1003), and/or any other suitable type of device. In the uplink direction, RU 1001 may receive traffic from UE 901 and/or another DU 1003 via the RF interface and may provide the traffic to DU 1003. In the downlink direction, RU 1001 may receive traffic from DU 1003, and may provide the traffic to UE 901 and/or another DU 1003.

RUs 1001 may, in some embodiments, be communicatively coupled to one or more MECs 1007. For example, RU 1001-1 may be communicatively coupled to MEC 1007-1, RU 1001-M may be communicatively coupled to MEC 1007-M, and so on. MECs 1007 may include hardware resources (e.g., configurable or provisionable hardware resources) that may be configured to provide services and/or otherwise process traffic to and/or from ULE 901, via a respective RU 1001. For example, RU 1001 may route some traffic, from UE 901, to MEC 1007 instead of to a core network (e.g., via DU 1003 and CU 1005). MEC 1007 may process the traffic, perform one or more computations based on the received traffic, and may provide traffic to UE 901 via an associated RU 1001. In this manner, ultra-low latency services may be provided to UE 901, as traffic does not need to traverse DU 1003, CU 1005, and an intervening backhaul network between DU network 1000 and the core network.

As shown, BLBS 101 may communicate with one or more elements of DU network 1000, such as with CU 1005 and/or one or more DUs 1003. As further shown, BLBS 101 may communicate with CUs 1005 and/or DUs 1003 of one or more other DU networks 1000. In this manner, BLBS 101 may be able to receive network-related information on a CU-level basis and/or a DU-level basis, and further may instruct CUs 1005 and/or individual DUs 1003 to modify beam configurations based on the network-related information and/or one or more UE models, as discussed above. In other words, BLBS 101 may be able to modify beams 105 on an intra-CU basis and/or an inter-CU basis.

Figure 11:
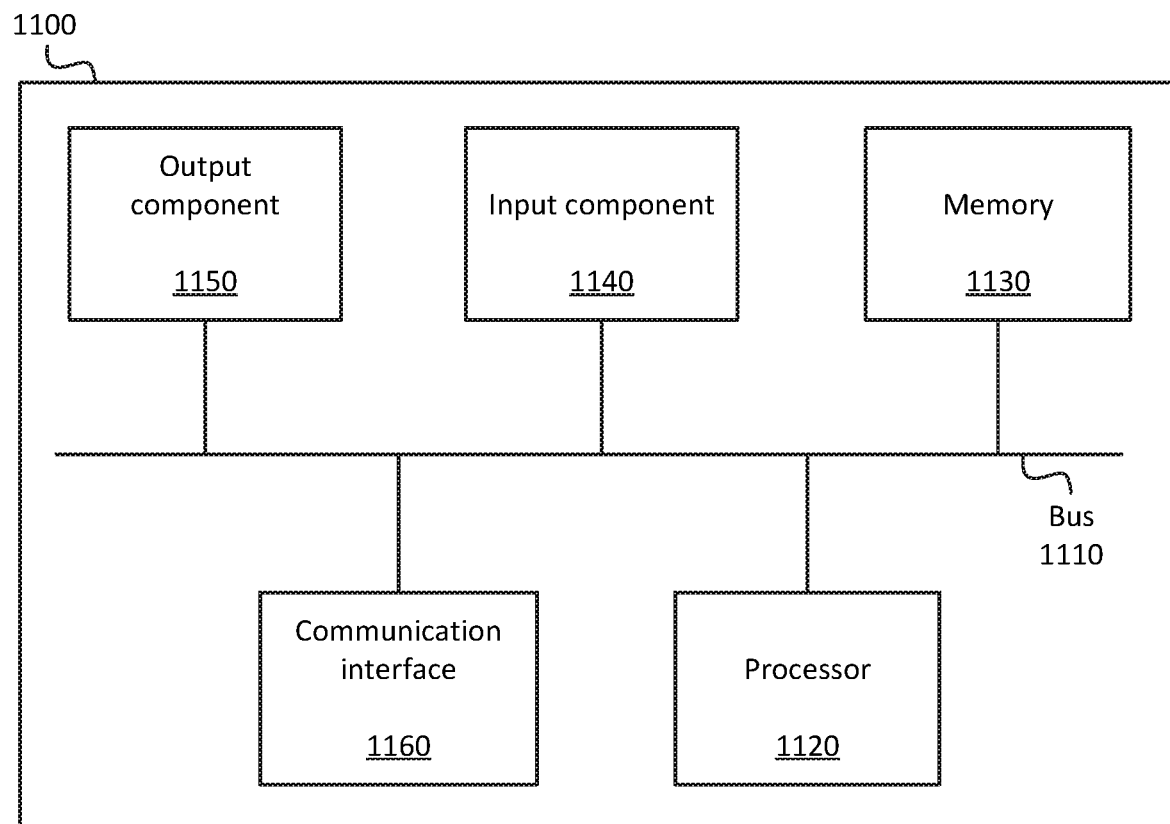
FIG. 11 illustrates example functional components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   generate or receive a predictive model associated with a plurality of User Equipment ("UEs"), the predictive model including a plurality of classifications for the plurality of UEs, wherein a particular classification for a particular UE is based on usage information associated with the particular UE;
   determine that at least a threshold quantity of UEs, with the particular classification associated with the predictive model, are connected to a first base station of a wireless network;
   determine that a second base station is within communication range of at least one UE that is connected to the first base station;
   identify one or more beam configurations, associated with a set of beams implemented by the second base station;
   determine, based on determining that at least the threshold quantity of UEs with the particular classification are connected to the first base station and further based on determining that the second base station is within communication range of the at least one UE, a modification to at least one of the one or more beam configurations associated with the set of beams implemented by the second base station, wherein the modification to the at least one beam configuration includes at least one of:
      modifying an azimuth angle of an antenna that implements the at least one beam,
      modifying a beam width of the at least one beam, or
   modifying an antenna power of the antenna; and
   instruct the second base station to modify the at least one beam configuration in accordance with the determined modification, wherein the modification to the at least one beam configuration causes the at least one UE to connect to the second base station in lieu of the first base station.

2. The device of claim 1, wherein the at least one beam configuration is a first beam configuration, wherein the modification is a first modification, wherein the one or more processors are further configured to:
   identify a second beam configuration associated with the first base station;
   determine, based on determining that at least the threshold quantity of UEs with the particular classification are connected to the first base station, a second modification to a second beam configuration associated with the first base station; and
   instruct the first base station to modify the second beam configuration in accordance with the second modification, wherein the connection of the at least one UE to the second base station in lieu of the first base station is further based on the instructing of the first base station to modify the second beam configuration.

3. The device of claim 1, wherein the usage information associated with the particular UE is based on at least one of:
   information indicating a type of content accessed by the particular UE, or
   information indicating an amount of traffic received by the particular UE over a particular time window.

4. The device of claim 1, wherein the usage information associated with the particular UE is based on public information posted by the particular UE or by a user associated with the particular UE, wherein the one or more processors are further configured to:
   determine, based on the public information, that the particular UE is likely to enter a coverage area associated with the second base station, wherein the modification to the at least one beam configuration associated with the second base station is performed based on determining that the particular UE is likely to enter the coverage area associated with the second base station.

5. The device of claim 1, wherein the one or more processors are further configured to:
   determine, based on determining that at least the threshold quantity of UEs are connected to the first base station, that network load associated with the first base station is likely to exceed a threshold measure of load,
   wherein the modification to the at least one beam configuration associated with the second base station is performed based on determining that the network load associated with the first base station is likely to exceed a threshold measure of load.

6. A non-transitory computer-readable medium, storing a plurality of processor-executable instructions to:
   generate or receive a predictive model associated with a plurality of User Equipment ("UEs"), the predictive model including a plurality of classifications for the plurality of UEs, wherein a particular classification for a particular UE is based on usage information associated with the UEs particular UE;
   determine that at least a threshold quantity of UEs, with the particular classification associated with the predictive model, are connected to a first base station of a wireless network;
   determine that a second base station is within communication range of at least one UE that is connected to the first base station;
   identify one or more beam configurations, associated with a set of beams implemented by the second base station;
   determine, based on determining that at least the threshold quantity of UEs with the particular classification are connected to the first base station and further based on determining that the second base station is within communication range of the at least one UE, a modification to at least one of the one or more beam configurations associated with the set of beams implemented by the second base station, wherein the modification to the at least one beam configuration includes at least one of:
      modifying an azimuth angle of an antenna that implements the at least one beam,
      modifying a beam width of the at least one beam, or
      modifying an antenna power of the antenna; and
   instruct the second base station to modify the at least one beam configuration in accordance with the determined modification, wherein the modification to the at least one beam configuration causes the at least one UE to connect to the second base station in lieu of the first base station.

7. The non-transitory computer-readable medium of claim 6, wherein the at least one beam configuration is a first beam configuration, wherein the modification is a first modification, wherein the plurality of processor-executable instructions further include processor-executable instructions to:
   identify a second beam configuration associated with the first base station;
   determine, based on determining that at least the threshold quantity of UEs with the particular classification are connected to the first base station, a second modification to a second beam configuration associated with the first base station; and
   instruct the first base station to modify the second beam configuration in accordance with the second modification, wherein the connection of the at least one UE to the second base station in lieu of the first base station is further based on the instructing of the first base station to modify the second beam configuration.

8. The non-transitory computer-readable medium of claim 6, wherein the usage information associated with the particular UE is based on at least one of:
   information indicating a type of content accessed by the particular UE, or
   information indicating an amount of traffic received by the particular UE over a particular time window.

9. The non-transitory computer-readable medium of claim 6, wherein the usage information associated with the particular UE is based on public information posted by the particular UE or by a user associated with the particular UE, wherein the plurality of processor-executable instructions further include processor-executable instructions to:
   determine, based on the public information, that the particular UE is likely to enter a coverage area associated with the second base station, wherein the modification to the at least one beam configuration associated with the second base station is performed based on determining that the particular UE is likely to enter the coverage area associated with the second base station.

10. The non-transitory computer-readable medium of claim 6, wherein the plurality of processor-executable instructions further include processor-executable instructions to:
    determine, based on determining that at least the threshold quantity of UEs are connected to the first base station, that network load associated with the first base station is likely to exceed a threshold measure of load,
    wherein the modification to the at least one beam configuration associated with the second base station is performed based on determining that the network load associated with the first base station is likely to exceed a threshold measure of load.

11. A method, comprising:
    generating or receiving a predictive model associated with a plurality of User Equipment ("UEs"), the predictive model including a plurality of classifications for the plurality of UEs, wherein a particular classification for a particular UE is based on usage information associated with the particular UE;
    determining that at least a threshold quantity of UEs, with the particular classification associated with the predictive model, are connected to a first base station of a wireless network;
    determining that a second base station is within communication range of at least one UE that is connected to the first base station;
    identifying one or more beam configurations, associated with a set of beams implemented by the second base station;
    determining, based on determining that at least the threshold quantity of UEs with the particular classification are connected to the first base station and further based on determining that the second base station is within communication range of the at least one UE, a modification to at least one of the one or more beam configurations associated with the set of beams implemented by the second base station, wherein the modification to the at least one beam configuration includes at least one of:
       modifying an azimuth angle of an antenna that implements the at least one beam,
       modifying a beam width of the at least one beam, or
       modifying an antenna power of the antenna; and instructing the second base station to modify the at least one beam configuration in accordance with the determined modification, wherein the modification to the at least one beam configuration causes the at least one UE to connect to the second base station in lieu of the first base station.

12. The method of claim 11, wherein the at least one beam configuration is a first beam configuration, wherein the modification is a first modification, the method further comprising:
identifying a second beam configuration associated with the first base station;
determining, based on determining that at least the threshold quantity of UEs with the particular classification are connected to the first base station, a second modification to a second beam configuration associated with the first base station; and
instructing the first base station to modify the second beam configuration in accordance with the second modification, wherein the connection of the at least one UE to the second base station in lieu of the first base station is further based on the instructing of the first base station to modify the second beam configuration.

13. The method of claim 11, wherein the usage information associated with the particular UE is based on at least one of:
information indicating a type of content accessed by the particular UE, or
information indicating an amount of traffic received by the particular UE over a particular time window.

14. The method of claim 11, wherein the usage information associated with the particular UE is based on public information posted by the particular UE or by a user associated with the particular UE, the method further comprising:
determining, based on the public information, that the particular UE is likely to enter a coverage area associated with the second base station, wherein the modification to the at least one beam configuration associated with the second base station is performed based on determining that the particular UE is likely to enter the coverage area associated with the second base station.

15. The method of claim 11, the method further comprising:
determining, based on determining that at least the threshold quantity of UEs are connected to the first base station, that network load associated with the first base station is likely to exceed a threshold measure of load,
wherein the modification to the at least one beam configuration associated with the second base station is performed based on determining that the network load associated with the first base station is likely to exceed a threshold measure of load.

16. The method of claim 15, wherein determining that the network load associated with the first base station is likely to exceed the threshold measure of load is performed independently of usage information generated by or received from the first base station.

17. The method of claim 11, wherein the particular classification for the at least the threshold quantity of UEs is indicated by the predictive model based on the at least the threshold quantity of UEs being associated with an amount of usage over a particular period of time that exceeds a threshold amount of usage.

18. The device of claim 5, wherein determining that the network load associated with the first base station is likely to exceed the threshold measure of load is performed independently of usage information generated by or received from the first base station.

19. The device of claim 1, wherein the particular classification for the at least the threshold quantity of UEs is indicated by the predictive model based on the at least the threshold quantity of UEs being associated with an amount of usage over a particular period of time that exceeds a threshold amount of usage.

20. The non-transitory computer-readable medium of claim 10, wherein determining that the network load associated with the first base station is likely to exceed the threshold measure of load is performed independently of usage information generated by or received from the first base station.

* * * * *